United States Patent [19]

Brown et al.

[11] 4,028,294

[45] June 7, 1977

[54] EPOXY MODIFIED ACRYLIC LATICES AND METHOD OF PRODUCING SAME

[75] Inventors: George L. Brown, Scotch Plains; Michael A. Tobias, Somerville, both of N.J.

[73] Assignee: Mobil Oil Corporation, New York, N.Y.

[22] Filed: Nov. 10, 1975

[21] Appl. No.: 630,610

[52] U.S. Cl. .................... 260/29.6 NR; 260/836; 260/837 R
[51] Int. Cl.² ........................................ C08L 33/02
[58] Field of Search ............... 260/29.6 NR, 837 R

[56] References Cited
UNITED STATES PATENTS

| | | | |
|---|---|---|---|
| 2,934,516 | 4/1960 | Hicks | 260/837 R |
| 3,945,963 | 3/1976 | Levine et al. | 260/29.6 NR |
| R25,880 | 10/1965 | Cline | 260/29.6 NR |

FOREIGN PATENTS OR APPLICATIONS

| | | | |
|---|---|---|---|
| 732,653 | 4/1966 | Canada | 260/29.6 NR |

*Primary Examiner*—M. J. Welsh
*Attorney, Agent, or Firm*—Charles A. Huggett

[57] ABSTRACT

Acrylic latices containing epoxy resins are prepared by emulsion polymerization in which an epoxy resin (polyepoxide) is incorporated into at least one of the monoethylenic monomers, including an epoxy-reactive monomer, and the monomers including the epoxy resin are emulsified into water containing surfactant to provide the oil phase of an oil-in-water emulsion. The monomers are then polymerized in the aqueous emulsion using a free radical polymerization catalyst and a reaction temperature which does not cause premature reaction between the epoxy groups and the reactive monomer. This provides thermosetting latex particles of fine particle size in the presence of less emulsifying agent than is normally needed.

7 Claims, No Drawings

EPOXY MODIFIED ACRYLIC LATICES AND METHOD OF PRODUCING SAME

The present invention relates to stable aqueous emulsions of copolymers of monoethylenic monomers, including a reactive monomer, and epoxy resins and the production thereof. In particular, it relates to the aqueous emulsion polymerization of acrylic monomers in admixture with epoxy resins to provide a thermosetting latex having superior properties, especially because of increased compatibility and reduced emulsifier content.

In an attempt to provide stable aqueous epoxy-containing emulsion systems which will thermoset on baking, the art has previously attempted to combine emulsions of acrylic copolymers, including an epoxy-reactive monomer (a maleic or fumaric half ester), with a separate emulsion of an epoxy resin. Such a system is shown in Cline U.S. Pat. No. Re 25,880. However, when separate emulsions are used, many difficulties are encountered. First, these two emulsions frequently demand a large amount of emulsifying agent which degrades film properties. Also, compatibility with the high molecular weight acrylic polymer is poor, and gloss is limited. Moreover, contact of the two resins is limited so strong catalysts must be used, and package stability has been a problem. Also, and particularly with the high molecular weight epoxy resins, organic solvents have been needed for the epoxy emulsions.

To avoid some of these difficulties, water dispersible aliphatic epoxy resins have been selected, but these have not been satisfactory because they are less reactive, they do not possess the superior physical properties of the aromatic polyepoxides, and package stability has been a problem since strong catalysts are again needed for the epoxy-carboxy cure.

In accordance with this invention, the epoxy resin component, which is preferably a water insoluble aromatic polyepoxide is incorporated into at least one of the monoethylenic monomers (normally by dissolving), including a monomer which is reactive with the epoxy group (preferably a carboxyl-functional monomer), and the monomers in the presence of the epoxy resin are copolymerized in aqueous emulsion at a temperature below which the epoxy reactive monomer will react with the epoxy groups of the polyepoxide, and in the presence of a free radical polymerization catalyst, to provide a stable latex of fine particle size despite the use of less emulsifying agent than is normally needed if the epoxy component had been omitted. This latex, when deposited and baked, cures at moderate baking temperatures to provide a thermoset film. The latex exhibits superior package stability, gloss is better and strong catalysts for the epoxy curing reaction can be avoided.

Although the addition of epoxy resin to acrylic monomers prior to polymerization is known in the prior art (see Devoe & Raynolds U.S. Pat. No. 2,934,516) its use has been confined to bulk or solution polymerization. Use of this concept in an aqueous emulsion polymerization system has not hitherto been apparent. Indeed, the subsequently filed Devoe & Raynolds application of Cline (see U.S. Pat. No. Re 25,880) employs a blend of two separate emulsions to form the thermosetting emulsion, thus establishing that the emulsion concept is not apparent from the teachings of U.S. Pat. No. 2,934,516, even to one in the same research group using essentially the same materials, and seeking to provide thermosetting latex coatings.

The aqueous emulsion polymerization of this invention leads to many advantages. In comparison with ordinary emulsion polymerization, the present copolymers are of lower molecular weight. Organic solvents are not required for the epoxy resin. In comparison with systems which include dissolved components, lower viscosity is needed at any given solids content. Also, and to get highly stable systems, the need for additional agents to cure the latex, such as an aminoplast resin, is eliminated. Moreover, compatibility is improved which yields higher gloss and eases the burden on the catalyst, so more stable systems can be provided.

From the standpoint of the new emulsion structure, the presence of the epoxy resin within the acrylic emulsion polymer particles serves many functions. First, it provides a more intimate mixture of the two components which assists the desired thermosetting cure. Second, it reduces the amount of emulsifying agent required to emulsify the acrylic copolymer. Third, the molecular weight of the emulsion copolymer is lowered (though it is still much higher than is obtained by solution polymerization) so that the epoxy resin is more compatible with the polymer and the cure of the latex is improved. Also, the presence of the epoxy resin in the polymer particles lowers the filming temperature of the emulsion polymer particles, and this allows the use of larger amounts of monomer which provides hard polymers when used alone in the absence of volatile solvent to aid coalescence of the emulsion particles.

The excellent compatibility between the epoxy resin and the small particle size of the emulsified particles enables one to obtain a good thermosetting cure in the absence of the tertiary amine or quaternary ammonium salt catalysts usually used. This allows ammonia, which is commonly employed to help stabilize the emulsion, to serve as the catalyst, and this leads to low temperature curing, solvent-free systems characterized by superior package stability. With more ammonia providing higher pH, the cure is improved, and the package stability remains better than when the tertiary amine or quaternary ammonium compounds are employed. The most stable systems have a pH of 4.5 – 6.5, preferably 5.0 – 6.0. At higher pH provided by the addition of ammonia, e.g., pH 7.0 – 9.0, the cure is improved, but storage stability is limited. It is a simple matter to add ammonia to the otherwise stable emulsion to provide the desired pH at the time of use.

It will be observed that the epoxy cure produces no volatile by-product, so in the preferred systems, only water and ammonia are released on baking. If the ammonia is omitted, somewhat higher temperature is needed for the cure, and then even the ammonia is not emitted.

The epoxy reactive monoethylenically unsaturated monomers used in the present invention are illustrated by carboxylic acids such as acrylic acid, methacrylic acid, itaconic acid, fumaric or maleic acids and their half esters. Hydroxy functional monomers may also be used, such as the hydroxy alkyl esters of the above monoethylenic acids, illustrated by hydroxyethyl acrylate. Unsaturated amides, such as acrylamide, or methacrylamide, are also useful.

These reactive monomers are used in a total amount of from 2–30%, preferably from 3–15%. The carboxyl-functional monomers are presently considered to be best.

The balance of the monomers consist essentially of nonreactive monoethylenic monomers, such as alkyl esters of acrylic and methacrylic acids, especially the $C_1$-$C_4$ alkyl esters thereof, e.g., methyl methacrylate, methyl, ethyl, propyl, and butyl acrylates or methacrylates, and the like. Styrene or vinyl toluene are also preferred monomers, as are acrylonitrile and vinyl acetate. The monomers yielding hard polymers in homopolymers preferably constitute at least about 45% of the copolymer preferably at least 50% of the copolymer.

Any polyepoxide may be employed for the purposes of this invention. However, it is preferred to employ water insoluble aromatic polyepoxides. These are desirably polyglycidyl ethers, especially those having a 1,2-epoxy equivalency of from about 1.4 to about 2, most preferably from 1.8-2.0. The molecular weight is also subject to considerable variation, but polyepoxides having a molecular weight of at least 300 up to about 10,000 are contemplated, the preferred molecular weight being from about 350 to about 4000.

The preferred polyglycidyl ethers are diepoxides based on dihydric phenols, especially bisphenols, such as bisphenol A. The term "bisphenol" identifies a pair of phenolic groups linked together through an intervening divalent alkylene group. The polyglycidyl ethers may be normally liquid or solid, but the solid products normally require added organic solvent which is not needed herein.

The aromatic polyepoxides have the best reactivity and provide the best properties. These aromatic products are water insoluble and will be illustrated herein by a diglycidyl ether of bisphenol A having an average molecular weight of about 390 (the commercial product "Epon" 828 manufactured by Shell Chemical Corp.).

The aqueous emulsion polymerization which is employed in this invention is a common free radical polymerization reaction. A mixture of the acrylic monomers and the epoxy resin is dispersed in water containing a free radical polymerization catalyst (a persulfate is commonly used) and heat is employed to bring about the desired polymerization. Surfactants in less than usual amount are present to maintain the stability of the emulsion.

The polymerization catalysts employed may vary considerably. Particularly useful are the persulfates such as potassium, sodium or ammonium persulfates. Also useful are the percarbonates, perborates, and peroxides, including benzoyl peroxide, cumene peroxide, caproyl peroxide. The polymerization in aqueous emulsion is itself conventional except for the presence of the epoxy resin and the proportion of surfactant needed for stability.

By having the epoxy resin mixed within the monomer particles, less surfactant is required, and this is surprising since water insoluble aromatic polyepoxides do not even emulsify themselves in water. The surfactants used are conventional nonionic and/or anionic surface active agents. These normally include a hydrophobic portion and a hydrophilic portion, but this is not essential. Nonionic surfactants which may be used in the polymerization include ethylene oxide derivatives of alkyl phenols, such as octyl or nonyl phenol containing from 10–60 mols of ethylene oxide per mol of the phenol, and long chain alcohols, such as dodecyl alcohol containing the same proportion of ethylene oxide. Other nonionic surfactants include the Pluronic materials and diverse other agents known to the art. The anionic surfactants include alkyl sulfates, such as lauryl sulfate, and diverse sulfonates such as Aerosol 22 and Aerosol MA which are the esters of sulfonated dicarboxylic acids, especially succinic acid. The surfactants useful in this invention are known to those skilled in the art and more fully illustrated in U.S. Pat. No. Re. 25,880 referred to hereinbefore.

In the preferred practice of this invention, one will employ from 0.25 up to 3, preferably from 0.5 to 2 parts of surfactant per 100 parts of ethylenic materials subjected to polymerization. More than this amount is normally used in the prior art for the polymerization of the ethylenically unsaturated materials in aqueous emulsion in the absence of the polyepoxide, and still more surfactant would normally be employed to bring in the polyepoxide in the form of a separately stabilized emulsion, particularly when solvent is present to liquify the polyepoxide.

Of course, the present invention includes the possibility of utilizing larger proportions of surfactant, but these are not necessary, and the systems including the larger proportion of surfactant are less satisfactory, both from the standpoint of expense, and also from the standpoint of the properties of the final film.

The proportion of polyepoxide can vary considerably, but generally one will employ from 3 to 50% of the polyepoxide, based on the total weight of resin solids in the emulsion. Preferred proportions are from 5–30% on the same basis. It will be appreciated that the proportion of polyepoxide in preferred practice will vary depending upon the molecular weight of the polyepoxide. In preferred practice, one provides an approximate stoichiometric equivalence between epoxy groups in the polyepoxide, and groups reactive therewith (e.g., carboxylic acid groups) in the acrylic polymer. This stoichiometry can conveniently vary from about equal proportions up to a 50% equivalent excess of epoxy reactive groups.

The polymerization temperature can vary considerably depending upon whether redox techniques are used to lower the temperature at which the catalyst liberates free radicals. The reactive monomers of greatest interest herein are those with epoxy reactive groups selected from carboxylic acid, hydroxy and amide groups, and these will not react so long as the polymerization temperature is held below about 100° C. Normal aqueous emulsion copolymerization is carried out at temperature of about 30° to about 90° C., preferably about 50° to about 85° C.

The following examples illustrate how the invention may be practiced, but are not to be construed as limiting its scope.

EXAMPLE 1

A three liter round bottom flask was charged with 1050.0 grams of deionized water, 12.8 grams of Aerosol 22 surfactant, and 5.4 grams of Aerosol MA surfactant. The vessel was purged for 15 minutes with nitrogen gas. Two and five-tenths grams of potassium persulfate were added and the mixture heated to 70° C. A mixture of 350.0 grams of methyl methacrylate, 315.0 grams of butyl acrylate, 35.0 grams of glacial methacrylic acid, and 70.0 grams of Epon 828 was added dropwise to the reaction vessel over 3 hours keeping the temperature of the reaction at 70° C. The latex was held at 70° C. for 2 hours, cooled to 25° C., and filtered through cheesecloth. The resulting product had a pH of 4.9, a total solids of 41.8% (2 hours at 150° C.), an aqueous acid number of 32.1 (on TS), a Brookfield viscosity of 20 cps., and a particle size of 0.1 microns. When air dried, this latex produced a clear, soft film which was readily soluble in acetone. When baked, it produced a clear, hard, acetone insoluble film.

Examples 2–5 were carried out by the procedure described in Example 1. The following Table I gives the weight in grams of the reactants used in each of these examples.

TABLE I

|  | Ex. 2 | Ex. 3 | Ex. 4 | Ex. 5 |
| --- | --- | --- | --- | --- |
| $H_2O$ | 1145 | 1050 | 1145 | 1145 |
| Aerosol 22 (note[1]) | 14.0 | 12.8 | 14.0 | 14.0 |
| Aerosol MA (note[2]) | 6.2 | 5.7 | 6.2 | 6.2 |
| $K_2S_2O_8$ | 2.75 | 2.50 | 2.75 | 2.75 |
| Methyl Methacrylate | 350 | 325 | 325 | 327.5 |
| Styrene | — | — | — | 52.5 |
| Butyl Acrylate | 315 | 315 | 315 | — |
| Ethyl Acrylate | — | — | — | 259.5 |
| Methacrylic Acid | 35 | 60 | 60 | 60.5 |
| Epon 828 | 140 | 70 | 140 | 140 |

(note[1]) grams of a 35% solution in water of tetra sodium N-(1,2-dicarboxyethyl-N-octadecylsulfosuccinamate), i.e. -Aerosol MA, a product of American Cyanamid.
(note[2]) grams of an 80% solution in water of sodium dihexyl sulfosuccinate, i.e.-Aerosol 22, a product of American Cyanamid.

It will be recognized that various modifications may be made in the invention as illustrated above. Thus, other esters of acrylic acid may be used effectively. Similarly, other water soluble epoxy resins may be used.

The incorporation of epoxy resins in acrylic latices provides the potential for developing fully aqueous coating systems with outstanding properties. Materials of these type could find application in packaging, coil coating, industrial metals, and maintenance coatings.

While preferred embodiments of the invention have been described above, various modifications may be made therein without departing from the scope of the invention as set forth in the claims wherein we claim:

1. A method of producing a thermosetting aqueous latex comprising dissolving a polyepoxide which is a diglycidyl ether of a bisphenol having a molecular weight in the range of 350–4000 into at least one of the monoethylenically unsaturated monomers to be polymerized, said monomers including from 2 to 30% of monoethylenic carboxylic acid, and the balance of said monomers consisting essentially of nonreactive monoethylenic monomers, emulsifying said monomers and polyepoxide in water with the aid of from 0.25–3 parts of surfactant per 100 parts of said monomers, polymerizing said monomers in said aqueous emulsion with the aid of a free radical polymerization catalyst and at a temperature below which said carboxylic acid will react with the epoxy groups of said polyepoxide, the relative proportion of said polyepoxide and said carboxylic acid monomer varying from about a stoichiometrically equivalent amount up to a 50% equivalent excess of said carboxylic acid monomer, and adding ammonia to said latex to provide a pH of 7.0–9.0 to stabilize the latex and catalyze the cure thereof.

2. A method as recited in claim 1 in which the epoxy reactive monomer comprises acrylic acid or methacrylic acid.

3. A method as recited in claim 1 in which at least 45% of said monomers are nonreactive monoethylenic monomers which produce hard homopolymers.

4. A method as recited in claim 3 in which said monomers producing hard homopolymers are selected from methyl methacrylate, styrene, vinyl toluene, acrylonitrile and vinyl acetate.

5. A method as recited in claim 1 in which said polyepoxide is dissolved in said monomers to provide a liquid mixture, said liquid mixture being added incrementally to the water containing said surfactant and said free radical polymerization catalyst, and heated to polymerization temperature.

6. A method as recited in claim 1 in which said monoethylenic carboxylic acid is present in an amount of from 3 to 15% of the total monomers.

7. A thermosetting aqueous latex coating composition produced as defined in claim 1.

* * * * *